United States Patent [19]

Hayfield

[11] 4,422,917

[45] Dec. 27, 1983

[54] ELECTRODE MATERIAL, ELECTRODE AND ELECTROCHEMICAL CELL

[75] Inventor: Peter C. S. Hayfield, Bickenhill, near Solihull, England

[73] Assignee: IMI Marston Limited, Wolverhampton, England

[21] Appl. No.: 293,961

[22] Filed: Aug. 18, 1981

[30] Foreign Application Priority Data

Sep. 10, 1980 [GB] United Kingdom ............... 8029076

[51] Int. Cl.³ .................. C23F 13/00; C25B 11/10; C25B 9/00; H05B 3/60

[52] U.S. Cl. .................. 204/196; 204/228; 204/242; 204/268; 204/269; 204/290 F; 204/291; 204/95; 204/109; 204/106; 204/112; 204/114; 204/72; 219/288; 219/295

[58] Field of Search ........... 204/291, 280, 284, 290 R, 204/290 F, 196–197, 228, 242, 254–256, 268–270, 222, 106, 109, 112, 114, 72, 82–104; 219/286, 288, 295

[56] References Cited

U.S. PATENT DOCUMENTS

| | | | |
|---|---|---|---|
| 2,798,038 | 7/1957 | Dean .......................... | 204/105 M X |
| 3,469,074 | 9/1969 | Cotton et al. .................. | 219/288 X |
| 3,865,703 | 2/1975 | Schenker et al. .............. | 204/105 R |
| 4,029,566 | 6/1977 | Brandmair et al. ............ | 204/291 X |
| 4,051,000 | 9/1977 | Gendron et al. ................ | 204/106 |
| 4,118,307 | 10/1978 | LaBarre ....................... | 204/290 G X |
| 4,146,438 | 3/1979 | de Nora et al. ................ | 204/106 X |
| 4,243,503 | 1/1981 | Lieb et al. .................... | 204/291 X |
| 4,252,629 | 2/1981 | Bewer et al. ................... | 204/291 X |
| 4,326,938 | 4/1982 | Das Gupta et al. ............ | 204/228 |

FOREIGN PATENT DOCUMENTS

| | | |
|---|---|---|
| 232680 | 4/1925 | United Kingdom . |
| 1231280 | 5/1971 | United Kingdom . |
| 1358926 | 5/1974 | United Kingdom . |
| 1438462 | 6/1976 | United Kingdom . |
| 1443502 | 7/1976 | United Kingdom . |

OTHER PUBLICATIONS

"Comprehensive Inorganic Chemistry", by Bailar et al., Permagon Press, Oxford 1973, p. 375.

*Primary Examiner*—Donald R. Valentine
*Attorney, Agent, or Firm*—Cushman, Darby & Cushman

[57] ABSTRACT

The invention provides an electrode material, and a method for its manufacture, for use in electrochemical reactions comprising bulk titanium oxide having the general formula $TiO_x$ where x is from 1.55 to 1.95 and also electrochemical cells including an electrode formed from such a material.

25 Claims, 2 Drawing Figures

ELECTRODE MATERIAL, ELECTRODE AND ELECTROCHEMICAL CELL

BACKGROUND OF THE INVENTION

This invention relates to electrode materials, electrodes formed from such materials and electrochemical cells. It has particular reference to electrodes forming anodes and/or bipolar electrodes.

There are numerous requirements in electro-chemical reactions for electrodes capable of passing an electrical current when connected anodically without dissolving or passivating. Examples of electro-chemical reactions requiring the use of anodes include cathodic protection, the formation of chlorates and hypochlorites by electrochemical oxidation of a chloride solution, the formation of persulphates and perborates, metal winning, organic oxidations and the evolution of chlorine from a chlorine cell.

Initially anodes were made from graphite or platinum or materials such as silicon-iron for use in cathodic protection systems. Improved anode materials were discovered, which basically comprised a substrate of titanium having a coating of a platinum group metal. Later discoveries, including the use of platinum group metal oxides, were more durable and economic in certain instances. By the term "platinum group metal" as is used herein is metal chosen from the group ruthenium, rhodium, palladium, iridium and platinum. Platinum group metals are electrocatalytically active, by which is meant that the material, when connected as an anode and immersed in an electrolyte, will continue to pass current into the electrolyte. There may be the evolution of oxygen, as in the case of an aqueous sulphuric acid electrolyte, or chlorine, as in the case of aqueous chloride containing electrolytes, or an electrochemical reaction at the anode which does not involve the evolution of gas. By comparison titanium uncoated with an electrocatalytic material passivates when connected as an anode in aqueous solutions by the rapid formation of an oxide layer by anodic oxidation. This oxide layer acts as a barrier to further conduction of electricity between the electrolyte and the titanium substrate. The third type of anodic reaction which can occur is for dissolution of the anode material, such as happens, for example, when copper is used as an anode in an aqueous copper sulphate solution.

Although anodes comprised of a sheet of titanium, in solid or foraminate form, having an electrocatalytic coating thereon have proved commercially feasible and are in widespread use, the cost of titanium does adversely affect the economic viability of the anodes. Also, titanium does suffer from a number of problems when used as a substrate for an electrocatalytic coating. Titanium can be subject to acid attack leading to acid undermining of the anodically active coating and the coating thereby falling off. Also titanium is rapidly hydrided when it is in the presence of hydrogen. Titanium hydride is brittle and falls into a powder.

The present invention is concerned with an electrode material capable, in the right circumstances, of use in electrochemical reactions in the uncoated state or, in alternative arrangements, for use in electrochemical reactions in the coated state. The present invention also provides an electrode formed of such an electrode material and an electrochemical cell incorporating electrodes formed from such electrode materials.

British Patent Specification No. 232 680 describes the manufacture of partially reduced titanium oxide. However, the techniques described, namely heating in air at temperatures between 800° and 1000° C., will not permit the reduction of the titanium oxide to any significant extent. Even reducing in hydrogen at these temperatures would only permit an x value in $TiO_x$ of approximately 1.93 to 1.94.

British Patent Specification No. 1 231 280 proposes the use of substoichiometric titanium dioxide as coatings for titanium anodes. These substoichiometric oxides are regarded as the anodic coatings in their own right. British Patent Specification No. 1 443 502 describes the use of a three-layer electrode of titanium in which there is an intermediate layer of $TiO_x$ wherein x is between 0.25 and 1.50 with an outer anodically active layer. British Patent Specification No. 1 438 462 describes an electrode comprising a flame sprayed or plasma sprayed layer of titanium suboxide on a substrate such as titanium wherein the titanium suboxide has the formula $TiO_y$ where y is between 0.1 and 1.999.

SUMMARY OF THE INVENTION

By the present invention there is provided an electrode material for use in electrochemical reactions comprising bulk titanium oxide having the general formula $TiO_x$ where x is a number in the region 1.55 to 1.95.

x may be in the range 1.65 to 1.9 or 1.85 or 1.7 to 1.8. The titanium oxide may predominantly be $Ti_4O_7$ and/or $Ti_5O_9$. The bulk titanium oxide may be in coherent or particulate form. For solid material x should be greater than 1.67 for strength reasons. There may be provided an electrocatalytically active surface on part at least of the surface of the titanium oxide. The electro-catalytically active surface may include a material chosen from the groups platinum group metals or alloys, platinum group metal oxides, lead and lead dioxide. The bulk titanium oxide may include a range of titanium oxide compositions.

The present invention also provides an electrochemical cell including an electrode formed from an electrode material as set out above.

The cell may comprise a cathodic protection system, the electrode comprising an anode such as a ground bed anode. The cell may be a bipolar cell, the electrode for the cell being formed of the titanium oxide material, preferably having a coating on one or both of its active faces. The cell may comprise a plurality of bipolar electrodes assembled in an array, the cell being a chlorate or hypochlorite cell having an aqueous sodium chloride feed and a chlorate or hypochlorite removal system.

The cell may be used for metal winning, the anodes in the cell being formed of the electrode material, preferably the metal to be electrowon being chosen from the group zinc, cobalt, cadmium, manganese, copper, nickel, lead, gold, platinum, silver, rhodium, ruthenium, palladium, osmium or iridium. The electrode may also be used as a cathode in metal recovery or as an anode or a cathode in the manufacture of manganese dioxide by the electrolysis of manganese sulphate solutions.

The cell may be used for carrying out redox reactions providing heavy metal ions for use in the oxidation of organic intermediates. The cell may also be used for direct organic electrosynthesis both at the anode and cathode surfaces.

The cell may be a metal plating cell, the metal to be applied preferably being chosen from the group silver, nickel, chromium, cadmium or iron.

The electrochemical cell may have its electrode in the form of a fluidised bed of particles of the electrode material.

The cell may be an electrode boiler with AC current applied to the cell to boil liquids or simply heat liquid between the electrodes formed of the electrode material.

The present invention also provides a method of manufacturing an electrode material which involves the steps of reducing titanium dioxide in a non-oxidising atmosphere at a temperature in excess of 1000° C. for a time in excess of one hour. The temperature may be in the region 1100° to 1500° C. for a time in the region one to 20 hours. The reduction may take place in an atmosphere of hydrogen. The titanium oxide powder may be moulded to form a "green" composite which is vitrified prior to reduction to the electrode material. Vitrification may take place in air at a temperature in the region 950° C. to 1650° C. The titanium dioxide powder may be admixed with an organic or inorganic binder to hold the "green" composite together, the organic binder burning off during the vitrification process.

The titanium dioxide may be reduced to the electrode material prior to compaction to form the solid body.

BRIEF DESCRIPTION OF THE DRAWINGS

By way of example embodiments of the present invention will now be described with reference to the accompanying drawings, of which.

DESCRIPTION OF THE PREFERRED EMBODIMENTS

Figure 1:
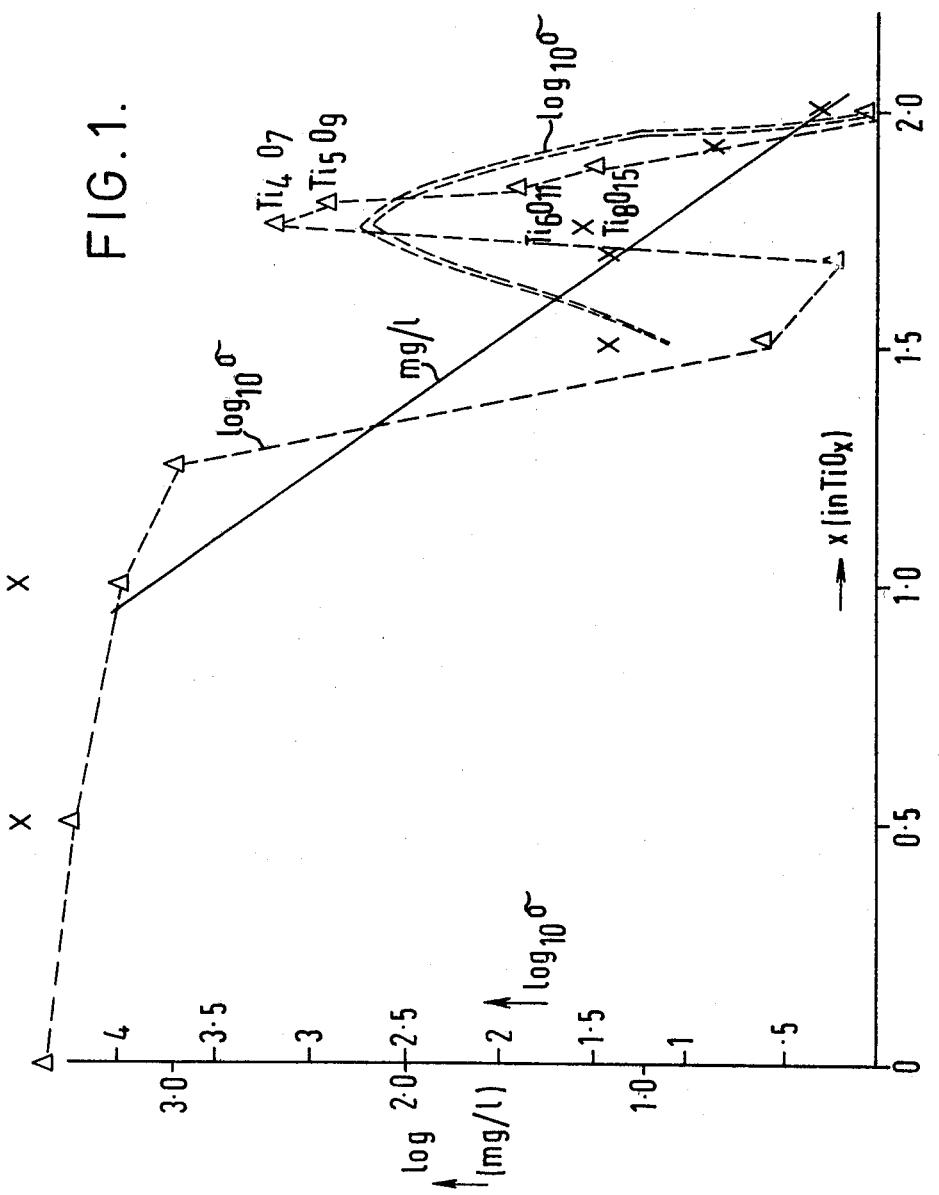
FIG. 1 is a graph of electrical resistivity and corrosion resistance of various reduced titanium oxide materials.

The starting point for manufacture of electrodes, electrode materials and cells in accordance with the present invention is the preparation of conducting corrosion resistant substoichiometric bulk titanium oxide. It has unexpectedly been found that the use of bulk $TiO_x$, where x is optimally 1.75, as an electrode in its own right or as a corrosion resistant electrically conductive substrate has distinct advantages over prior art constructions.

The bulk of the experimental work carried out has been done on $TiO_2$ which is mixed with a binder for cohesion purposes to enable "green" structures to be formed by a conventional pressing operation. These green structures are vitrified by heating in air to a temperature in the region 950° C. to 1600° C. After the product has been vitrified it is reduced in hydrogen to form the desired electrode material. Typically it has been found that a reduction over a period of 4 hours at 1150° C. enables the final product to be formed in which the composition is $TiO_{1.75}$, ie $Ti_4O_7$. Although it is possible to use a clay as the binder during the pressing operation it is preferred that an organic binder is used which is burnt out prior to the vitrification stage. During the reduction stage a slight increase in porosity of the material occurs and it is preferred that the increase in porosity is kept to a minimum. It has been found tht after reduction to $Ti_4O_7$, the electrical resistivity of the material is approximately $1000 \times 10^{-6}$ ohm/cm.

A number of alternative routes to the formation of $TiO_x$ bodies are possible. Thus starting with $TiO_2$ powder it can be pressed to form a green structure and then reduced in hydrogen; or heated in argon or vitrified in air and given a subsequent heat treatment at a lower temperature in hydrogen. Alternatively, the titanium oxide powder can be reduced in hydrogen to form $TiO_x$ powder which can then be compacted to the green state and given an argon or vacuum heat treatment to form a solid product.

Instead of using a hydrogen reduction system, mixtures of $TiO_2$ and a reducing agent, such as titanium powder itself, can be converted to $TiO_x$ bodies, either by compaction directly of the mixtures to the green state and then given an argon or vacuum heat treatment or other non-oxidising atmosphere at temperatures below 1600° C. to form the $TiO_x$ body or the mixture of powders can be reduced directly to $TiO_x$ powder. This $TiO_x$ powder could then be compacted to form a green body which could be argon or vacuum heat treated at temperatures below 1600° C. to form the $TiO_x$ body.

It it was required merely to produce a $TiO_x$ powder clearly the route could either involve hydrogen reduction of $TiO_2$ powder or argon and vacuum heat treatment of mixtures of $TiO_2$ and Ti. Alternatively $TiO_2$ may be admixed with TiN, $TiSi_2$, carbon, Si, TiO and $Ti_2O_3$ as reductants.

To manufacture compositions in the region $Ti_3O_5$ to $Ti_5O_9$, mixtures of $TiO_2$ to Ti having molar ratios in the region 6:1 to 8:1 were heated at temperatures in the region 1400° C. to 1500° C., preferably 1450° C., for two hours under argon or nitrogen. To manufacture compositions in the region $Ti_3O_5$ to $Ti_5O_9$, it was possible to use a silicide reduction route by mixing $TiO_2$ and $TiSi_2$ in the molar ratios 23:1 to 11:1. These mixtures were then heated at temperatures in the region 1250° C. to 1350° C. under argon thereby forming the reduced $Ti_3O_5$ to $Ti_5O_9$ together with $SiO_2$.

Titanium nitride may be used to reduce $TiO_2$ to form compositions in the region $Ti_5O_9$ to $Ti_4O_7$. A typical example would be the admixture of $TiO_2$ plus TiN in the molar ratio of 11:1 and heating at temperatures between 1200° C. to 1450° C. in an atmosphere of argon or nitrogen. The materials $Ti_3O_5$, $Ti_4O_7$ or $Ti_5O_9$ may be manufactured by the direct reduction of $TiO_2$ using silicon. A typical example would be to admix $TiO_2$ plus Si in the molar ratios 8:1 and at temperatures between 1200° C. and 1450° C. in an atmosphere of argon or nitrogen.

Having produced the $TiO_x$ body the value of x can be varied simply by increasing the time and/or temperature of heat treatment of the $TiO_2$ in hydrogen. Extensive series of tests have been carried ut to determine the electrical conducitivity and the solubility of $TiO_x$ with a varying x in order to optimise the electrode material in accordance with the present invention. The results of these tests are shown graphically in FIG. 1. From FIG. 1 it can be seen, referring to the solid line labelled "mg/1" where "mg/1" is the amount of the material (shown on a log scale) dissolved per unit time in sulphuric acid of 165g/1 plus fluoride and chloride ions in milligrams per liter against x in $TiO_x$. This shows that the corrosion resistance increases virtually continuously with an increase in x in the $TiO_x$. By comparison, however, the electrical conductivity of the material shown in dotted lines ($log_{10}$) shows a pronounced peak around $Ti_4O_7$ ie $TiO_{1.75}$. The dotted lines refer to single crystal conductivities whereas the double dotted lines refer to the conductivity of material prepared by the hydrogen reduction route of the present invention.

It is important to note that hydrogen reduction of $TiO_2$ is only practical in circumstances where the material is not applied to a titanium substrate. Thus because of the great affinity of titanium for hydrogen any attempt to reduce a titanium oxide layer on titanium by heat treatment at temperatures in excess of 1000° C. in a hydrogen atmosphere would lead to total embrittlement and failure of the titanium substrate. It will be appreciated, therefore, that the heat treatment route described above as the preferred route for the manufacture of electrode materials in accordance with the invention is possibly only in practice on bulk titania where this material is not present on a titanium substrate. It should also be noted that the unique combination of high electrical conductivity and high corrosion resistance occurs optimally at the composition $Ti_4O_7$, although $Ti_5O_9$ is almost as good. The distinct improvement in properties over compositions such as $TiO_{1.5}$ can clearly be seen from the information contained in FIG. 1.

To give an indication of the corrosion resistance of the materials manufactured in accordance with the present invention and forming the subject of the invention tests have been carried out on titanium oxide which has been heat treated for 3 hours in hydrogen at a temperature of 1200° C. When corrosion tested in the polarised condition in a solution of 165g/l sulphuric acid plus traces of chloride and fluoride ions, $TiO_{1.75}$ had a corrosion rate after 35 days of 0.008g/m²/day. Unpolarised material in the same condition over the same period had a corrosion rate of 0.019 g/m²/day. By "polarised" is meant that the material was connected as an anode at a voltage of 3v. It can be seen that in the open circuit or unpolarised condition the corrosion rate of the material is just over twice that of the polarised material. By comparison the corrosion rate under the same conditions for plain titanium rod when polarised was 0.005g/m²/day and in the open circuit condition was 30.2g/m²/day. Thus, although the corrosion rate of the two materials, ie titanium and $TiO_{1.75}$, is not that different in the polarised condition there is a vast increase in corrosion resistance when the materials are in the open circuit condition. This has potentially great significance for use in practical electrochemical cells in that although for the vast majority of the time the anodes are polarised, they are left occasionally in the unpolarised condition. The corrosion rate of the materials of the present invention in the unpolarised condition is almost as low as in the polarised condition and is vastly superior to that of ordinary titanium.

The preferred material of the invention, $Ti_4O_7$, was exposed to 2 molar NaOH at 25° C. for a period of 32 days and showed no measurable rate of corrosion. Tests of the same material in a 60% NaOH solution at 90° C. produced no corrosion in 7 days. In both cases the $Ti_4O_7$ was not polarised.

$TiO_x$ material in accordance with the present invention can be formed into almost any desired shape of product. Because it is manufactured by a sintering route any product shape capable of being formed by sintering is available for manufacture. Complex shapes can be made by the choice of dies for pressing or extrusion in the green state. It is also possible to carry out certain machining in the green state such as drilling holes, machining rims etc. Products can also be polished in the vitrified state and a further advantage of the present invention is that products which have been polished and show the polishing marks in the vitrified state are largely smoothed out in the hydrogen reduction to form $Ti_4O_7$. The principal shapes for production would be rods, tubes, rectangular section bars, discs, plates etc. Because of the essentially ceramic nature of the material it is preferred to keep the product size reasonably restricted. As has been mentioned above, the conversion of the $TiO_2$ to $TiO_{1.75}$ results in an increase in the porosity of the material. The porosity appears to result from crystallographic transformation of the material and, provided the amount of binders used is kept to a minimum, does not adversely affect the strength of the material. It has to be noted, however, that should the reduction continue such that nuclei of $Ti_3O_5$ are formed, almost complete loss of mechanical strength of the product occurs. To minimise the porosity or to fill the pores an infilling operation can be given by painting the products with a tantalum pentachloride paint which is then thermally decomposed in air to form tantalum oxide. Optionally a further vacuum heat treatment may be given prior to the application of an anodically active coating. The application of the tantalum pentoxide not only appears to infill some of the pores in the $Ti_4O_7$ but may impart an enhanced surface corrosion resistance to the material by formation of a titanium/tantalum suboxide solid solution. It is possible that such an enhancement may be obtained by the application of niobium oxide in a similar manner. Because of the inherently high corrosion resistance of the products in accordance with the invention it is difficult to be certain of the amount of corrosion enhancement obtained by the application of tantalum pentoxide.

It has already been found that the plain $TiO_x$ is suitable for certain electrochemical reactions such as for use as an electrode boiler. One advantage in using the uncoated materials is their freedom from toxid substances. Thus, when heating consumable materials, such as milk, uncoated $TiO_x$ products may be satisfactorily used as electrode boiler electrodes.

Although the uncoated $TiO_x$ electrodes formed of a material having the composition $TiO_{1.75}$ will perform as oxygen evolving electrodes in metal winning, and in other electrochemical cells, the over-potentials they appear to exhibit may make them slightly uneconomic. Improvements in the over-potentials can be obtained by coating the bulk $TiO_x$ with anodically active materials in a manner well known per se. The nature of anodically active coating does not form in itself a feature of the present invention but the coating can be chosen to suit the application. Thus, for metal winning iridium-containing coatings may be most suitable, whereas for use in chlorate production platinum-iridium coatings are preferred. These coatings may be applied either by a paint firing technique or by electroplating or by combinations of both of these in a manner well known per se.

$TiO_2$ ceramic made by conventional ceramic techniques usually has a residual porosity of a few per cent, but can be specifically manufactured, without too much loss of mechanical strength, with porosity of up to 20%. On transformation of rutile ceramic to $Ti_4O_7$ or $Ti_5O_9$, a further increase in porosity occurs, and especially in surface layers where there is a tendency to reduction more readily then in the body of the component. This high real surface area to the material is advantageous for some applications, both in the uncoated and coated state.

For alternate uses, it is desirable to infill pores such that very low loadings of electrocatalyst can be applied to the outermost surface. Such infilling is preferably made with a material as corrosion resistant, or more so, than the $TiO_x$. The infilling can be insulating and water repellant, eg polytetrafluoroethylene or semi-conducting, eg titanium oxide deposited by thermal decomposition of a titanium bearing paint, eg tetra-n-butyl titanate or titanium trichloride in alcohol or water. Alternatively, and usually preferably, the pore infilling can be made with a highly electrically conductive material, such as certain noble metals and noble metal oxides, including ruthenium, iridium and platinum. It has also been found that mixtures of oxides may advantageously be used to infill porosity such as codeposited and thermally decomposed mixtures of titanium oxide and ruthenium dioxide. Alternatively titanium dioxide can be applied first, which, by virtue of its porosity, can be rendered electrically conductive by means of subsequent depositions of noble metal or noble metal oxide, such as iridium oxide. because some of the surface pores are a few microns to a few tens of microns in size, it has been found helpful to speed up pore infilling by admixing to the points applied a quantity of $Ti_4O_7$ powder that has been comminuted to a particle size of not greater than a few microns. Alternative conductive infilling materials could be usefully used.

A pore-filled $TiO_x$ surface is readily assessed visually by the improved specular reflectivity. Onto a pore-filled surface can be applied established electrocatalyst coatings in controlled low loadings. It has been found feasible, for example, to apply loadings of 70/30 platinum-/iridium in lg/m² steps up to 5 g/m², but of course much heavier loadings are also possible to apply. The outer coating is not limited to platinum/iridium and may be of any electrocatalyst material.

Electrodes for use in per-oxidation reactions, such as in the manufacture of persulphate compounds, may be formed by manufacturing a $TiO_x$ rod having a thread on its surface and winding highly polished platinum wire into the grooves of the thread. The ends of the wire can be potted in a suitable manner to enable electrical connections to be made to the wire itself.

$Ti_4O_7$, both solid and in powder form, can be used advantageously in circumstances where carbon or graphite has been used previously, and sometimes found wanting. For example, $TiO_x$ powder can be used as an electrocatalyst, or as an electrocatalyst support, in fuel cell electrode constructions, where its high corrosion resistance to sulphuric acid in particular is advantageous.

$Ti_4O_7$ could advantageously be used as a material for photoanodes and photocatalysts in the dissociation of water.

$TiO_x$ powder, and especially when coated with the noble metals and the noble metal oxides which are used in chloralkali technology, can be used as the catalyst for application to sheets of polymer used in solid electrolyte forms of electrolysis cells.

EXAMPLE 1

A $TiO_2$ tube, of dimension 12 mm OD 8 mm ID × 100 mm long, was first made. To improve electrical conductivity, the $TiO_2$ tube was additionally heated in hydrogen at 1150° C. for 4 hours. Upon cooling the tube was coated on the outside with iridium, by applying 4 coats of an iridium chloride paint (50 g/l iridium metal content), stoving each coat in air at elevated temperature for 15 minutes.

On completion of the iridium coating on the outside surface, the inside surface was coated with 0.115 mm of lead by electrodeposition, flowing the plating solution through the tube and thus not exposing the outer iridium coating to the plating solution.

To establish electrical contact to the material, a titanium spring was applied to the lead coated internal surface, the one end of the titanium stretching out as a wire for external electrical connection, whereas the other end of the tube was closed with a rubber bung.

The tube sample was immersed vertically in simulated zinc winning solution . . . 165 g/l sulphuric acid + 115 ppm chloride + 5 ppm fluoride . . . and operated as an anode at 442 A/m² current density on the iridium coated part. After 27 weeks of operation the electrode was still operating at an attractively low cell voltage with respect to an aluminium cathode and the test was then terminated.

EXAMPLE 2

A $TiO_x$ tube as per Example 1 was coated with a nominal loading of iridium to 20 g/m² (by weight gain). The electrode so formed, and without an inner lead sheathing, was placed on test as an anode in the same simulated zinc winning liquor as Example 1. After 10 weeks of electrolysis at 666 A/m², the anode was still operating satisfactorily. Another sample, coated with iridium to only 10 g/m², was also placed on an electrolysis test and after 10 weeks was still operating satisfactorily. Other tubes coated with 10 g/m² iridium performed equally well under the test conditions described, including those with additions of tantalum in the tube material of up to 1% of the tube weight. The tantalum was added in the precalcining stage of powder formation prior to extrusion and vitrification, and in one instance was added as tantalum pentachloride, and in another as potassium tantalum fluoride ($K_2TaF_7$).

EXAMPLE 3

A $TiO_x$ tube as per Example 1 was coated with iridium by a paint/stoving route, except that the iridium paint was drawn into the pores of the substrate by a vacuum route. The electrode so made was placed on test as an anode in sulphuric acid at 3330 A/m², and after 54 days was still operating satisfactorily.

EXAMPLE 4

To assess the suitability of a solid $TiO_x$ substrate as an energy saving electrode, a $TiO_x$ tube was taken as described in Example 2 and as coated to a nominal 10 g/m² iridium. The tube was then clamped to a titanium metal conductor bar by means of two titanium spring clips. The separation between the two clip connections was 70 mm.

With the above electrode operating as an anode at 666 A/m² current density, the anode electrode potential between the two titanium metal clips was measured using a Luggin probe connected to a saturated mercurous sulphate half cell electrode. At positions adjacent the titanium metal clips, the electrode potential was −0.960 volts. At a position most distant from the titanium clips, ie 35 mm from the nearest metal clip, the electrode potential was −0.980 volts. With the reversible electrode potential in the simulated zinc electrolyte at −0.568 volts, the oxygen overpotentials over the iridium surface varied between 392 and 412 millivolts. A solid titanium electrode coated with iridium to 10 g/m² loading produced identical oxygen overpotential characteristics.

EXAMPLE 5

A tube of titania, reduced in hydrogen to predominantly $Ti_4O_7$, was used as a cathode in 3% sodium chloride at ambient temperature, the counter electrode being a 70/30 Pt/Ir coated titanium anode. Operated at a cathode current density of 5000 A/m², the test was terminated after 932 hours for examination of the cathode. Visually there was no change in appearance from that existing at the start of the test.

EXAMPLE 6

In a comparative test, the electrode potential was compared of solid $TiO_x$, solid $TiO_x$ coated with electroplated platinum and solid titanium metal, when made cathodic at various current densities in 3% sodium chloride solution at 20° C. Relative electrode potentials with respect to a saturated calomel reference electrode at 1000 A/m² were Uncoated $TiO_x$: −1.80 volts
Uncoated titanium: −1.58 volts
Platinum coated $TiO_x$: −1.14 volts

EXAMPLE 7

An electrolytic cell of a filter press design was set up with a single bipolar electrode. Monopoles were a 70/30 Pt/Ir coated titanium as the anode and uncoated titanium as the cathode. The central bipole consisted of a disc ¾ in diameter of hydrogen reduced titania. The anode face had been coated with iridium by application of 4 coat/stoves of chlor-iridic acid in a solvent, each coating being stoved at elevated temperature for 20 minutes. The estimated applied loading, by weight uptake, was 5 g/m² iridium.

The cell was operated at 5000 A/m² plan surface area on all electrode faces. The electrolyte was 220 g/l brine maintained at 80° C. and pH of 3.0. The volume of the cell was 8.6 ml and the brine refreshment rate 35 times per minute.

In this test assembly, the central $Ti_4O_7$ bipole operated with the iridium applied to the anode face and the uncoated face as the cathode. After 583 hours of continuous operation, in which both compartments operated stably at circa 4.4 volts cell voltage, the cell was dismantled for destructive examination of the $Ti_4O_7$ bipole. No evidence was found for hydride formation on the outer surface of the $Ti_4O_7$ cathode. Chemical determinations of total hydrogen content in the $Ti_4O_7$ both at the cathode surface and midway through the 5 mm thick material revealed exactly the same levels at 10 parts per million. X-ray examination of the cathode face revealed no further reduction of the $Ti_4O_7$ starting phase.

EXAMPLE 8

The bipolar type experiments described in Example 7 were extended using cells generally containing two bipoles. In some arrangements the bipoles were hydrogen reduced titania discs, and in others solid titanium electrodes were used for comparative purposes.

Another cell contained two hydrogen-reduced titania discs, the anode faces of each being coated with approximately 55 g/m² of platinum electroplate from a bath normally used for applying coatings to titanium (standard sodium hexahydroxyplatinate solution). It was observed that the platinum thickness on the $TiO_x$ discs could be monitored non-destructively using non-dispersive X-ray fluorescence, just as used for monitoring platinum coated titanium metal.

The cell was put into operation with all surfaces operating at a plan current density of 1500 A/m². The electrolyte recirculated through the cell was a 30 g/l brine controlled at a pH of 7. The cell was a mini electrochlorinator. After 246 days of continuous operation, apart from a few hours duration after 48 days to remonitor the thickness of platinum on the anode surfaces, visually examine the cathode faces and renew seals, the cell voltage was remaining stable. There was no change in appearance of the cathode surfaces from unused control material, the surfaces remaining smooth to the touch.

Yet another cell was set up, very similar in set up to that containing two hydrogen reduced discs but containing hydrogen reduced titania bipoles that had been coated on both sides with platinum electroplate. Operated with all surfaces at 1500 A/m², with electrolyte 30 g/l brine at pH 7 and ambient temperature, the current through the cell was reversed every 30 minutes by means of a timer. Both monopole electrodes consisted of platinum electroplated titanium. The cell was energised, and apart from an isolated few hours interruption to monitor platinum loadings, the cell has since been in continuous operation for a total period of 222 days. Wear rate of platinum coating on the platinum electroplated $TiO_x$ bipole electrodes was the same as on the platinum electroplated titanium monopoles.

EXAMPLE 9

To simulate operation of anodes under cathodic protection operation, hydrogen reduced titania tube was coated on the outside with nominally 55 g/m² of platinum electroplate and then immersed in 3% sodium chloride maintained at ambient temperature. Operated at 1000 A/m² with respect to a steel cathode placed some 10 cm distant, the anode was energised and continues satisfactorily on test after 36 weeks.

EXAMPLE 10

Hydrogen reduced titania tube was coated on its outer surface with approximately 1 mm of lead dioxide using a standard nitrate-based bath. The electrode so made was stable, and micrographic examination of a cross-section revealed good bonding between the titania and the lead dioxide coating. It was operated at 100 A/m² in 100 g/l $H_2SO_4$ plus trace halides for 7 weeks without failure and the test was then terminated.

EXAMPLE 11

Hydrogen reduced titania tubes were coated with nominally 55 g/m² of platinum using two different plating solutions (sodium hexahydroxy-platinate and P-salt). Both were subsequently mechanically polished to provide a mirror-finish coating of the platinum for assessment in electrolytic per-oxidation reactions.

EXAMPLE 12

A number of $TiO_x$ tubes were coated on the outside with iridium by a paint/stoving process to loadings of 10 to 15 g/m². Such electrodes have subsequently been mounted in cells to evaluate durability under ranging conditions of sulphuric acid, including concentration . . . 83, 165, 330 and 660 g/l, current density . . . 666 and 3330 A/m², temperature 35° and 80° C. The cells remained on continuous electrolysis in excess of one year before the tests were terminated.

EXAMPLE 13

To evaluate coated $TiO_x$ components as anodes on a larger scale than single 12 mm OD×100 mm long tubes, a titanium structure was made with titanium clips for making electrical contact to the iridium coated titania tubes. Two assemblies, each comprising 12 coated tubes, were made anodes in 165 g/l sulphuric acid + 115 ppm chloride + 5 ppm fluoride at ambient temperature. Added to the electrolyte of one was 9 g/l of manganese as manganese sulphate. The electrodes continued in satisfactory operation for four months.

EXAMPLE 14

An electrode assembly as described in Example 13 was used as an anode in cobalt electro-winning. The electrolyte consisted of 40 g/l cobalt as cobalt sulphate, 1 g/l manganese as manganese sulphate, 9 g/l magnesium calculated as oxide, 0.3 g/l calcium fluoride and 15 g/l sulphuric acid. Temperature of solution was 80°–85° C. and the total cell current 20A.

The anode was used in cobalt deposition runs over 24 days, with satisfactory current efficiency of cobalt deposition. The starting electrode potential of the anode with respect to a saturated sulphate half cell reference electrode was in the range 0.9–1.15 volts and after 24 days' use, extensively coated with cobalt oxide and manganese dioxide, the electrode potential levelled at 1.25–1.3 volts. Both Luilu cobalt silicide-based anodes, and lead-based anodes, operated under similar electrolytic conditions at circa 1.8–2.0 volts.

EXAMPLE 15

Pieces of sheet $Ti_4O_7$ measuring 20×80×5 mm were used as pairs of electrodes, uncoated, in the electrolysis of artificial seawater to make hypochlorite. The current density applied was 50 A/m$^2$. The electrolyte was at ambient temperature. One cell contained a pair of $Ti_4O_7$ electrodes, separated by a distance of 20 mm, operated under continuous DC conditions, the one electrode acting permanently as the anode, and the other permanently as the cathode. The two electrodes evolved gases as expected, but in addition calcium salts were deposited on the cathode. Over several weeks of operation the cathode collected such massive calcium hydroxide deposit as to bridge the gap between itself and the adjacent anode. Shortly afterwards the electrolysis of the electrolyte was terminated.

In an adjacent cell, two similar $TiO_x$ electrodes were operated with current flowing at 50 A/m$^2$ in one direction for $\frac{1}{2}$ hour, and then by means of a timer in the electrical circuit, the current was reversed for the next $\frac{1}{2}$ hour. By reason of the current reversal, neither electrode had accumulated calcium-bearing scale and the cell remained clean. After more than two months on test, the electrolysis continued and the electrodes had maintained their initial appearance.

EXAMPLE 16

In Experiment 15, it was observed that when the current was reversed between the $TiO_x$ electrodes, the cell voltage did not automatically reverse from positive to negative or vice versa, but rather changed slowly over a period of minutes, and at one stage the cell was operating at full current with zero cell voltage. In ancillary experiments, it was established that the longer the period of DC electrolysis prior to current reversal, the longer the period for the cell voltage to reverse in spite of the current having been forcibly reversed by the timer and external current supply. The explanation of this is not yet available, but it is in part believed to result from oxidation of adsorbed hydrogen at one electrode and reduction of adsorbed chlorine at the other. However, the possibility of solid state reactions in the $TiO_x$ cannot be excluded. The system therefore exhibited energy storage, with potential commercial application.

As has been mentioned above one of the distinct advantages of the product in accordance with the present invention is its resistance to hydrogen embrittlement when compared to plain titanium. It has been found that the solid $TiO_x$, where x is preferably 1.75, forms an ideal material for use as a bipolar electrode.

Figure 2:
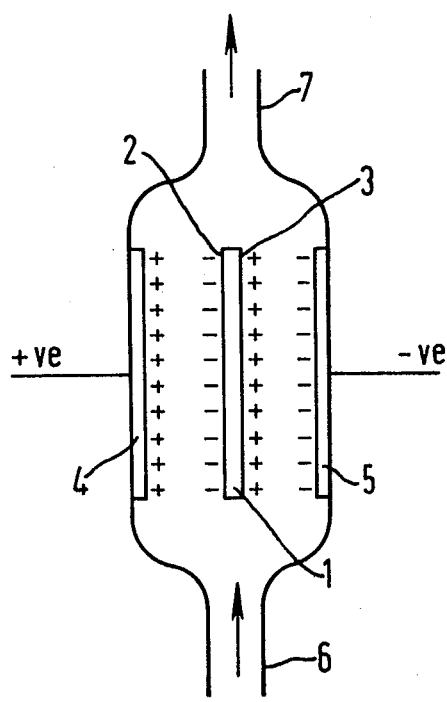
FIG. 2 is a schematic view of a bipolar cell.

A bipolar electrolysis cell is illustrated in FIG. 2 in schematic form. The cell basically comprises a central bipolar electrode 1 which has a cathodically active side 2 and an anodically active side 3. It is located between two end electrodes 4 and 5 which are respectively an anode and a cathode. Brine at the appropriate temperature is passed along line 6 into the cell and sodium chlorate is passed out of the cell along line 7. Since the voltage is induced in the bipolar electrode under the action of the electrical field, obviously no electrical connections are required to the electrode per se. As many bipolar electrodes as required can be provided between the end electrodes as is well known in the art. Tests over many months have shown that the $TiO_{1.75}$ bipolar electrode material having a platinum-iridium coating on the anode side operates perfectly satisfactorily as a bipolar electrode with no hydrogen take-up of any significant quantity on the cathode side (and hence no distortion or failure of the cathode side). By comparison, plain titanium bipolar electrodes became blistered and started to fail within the same time span. The use of the bipolar electrode in accordance with the present invention can be regarded as a significant improvement over the present bipolar electrodes which basically are formed of graphite or are disposable (titanium which are throw-away after hydrogen embrittlement) or are formed of complex, explosively welded, multi-layer structures.

Because of the nature of the $TiO_x$ material—it is essentially ceramic-like—it is difficult to manufacture in large sizes. If required, therefore, blocks of the material may be joined to a sheet of metal such as titanium by means of an electrically conductive glue. A typical glue would be a silver containing glue. The blocks may be regarded as tiles bonded by the electrically conductive glue to the titanium substrate. A silicone rubber grout may be provided in the spaces between the tiles to protect the glue from the environment in which the electrode acts. Alternatively the tiles may be bonded to the substrate by means of a braze or solder. The metal substrate may be a material which could be corroded, such as copper, provided it is adequately protected by the grout.

In addition to the resistance of the cathode to hydriding it is possible to coat the cathode side of the bipolar electrode with a noble metal coating to lower the hydrogen over-potential and hence improve on power efficiency for hypochlorite production when used in a bipolar electrochlorinator. Because of the ability of the bipolar material to act as both an anode and a cathode the cell could be made self-cleaning by means of current reversal. Apart from the use of the $TiO_x$ in electrochlorinators coated solid $TiO_x$ could replace graphite in chlorate cells where the advantages would be:

(a) the use of a material that does not significantly change in dimensions in use;
(b) the use of a material which as a cathode can be noble metal coated to lower the hydrogen overpotential and hence increase power efficiency.

Although there is described the use of a bipolar electrode in chlorate production, obviously hypochlorite could be produced in a similar cell, or other chemicals as desired.

In addition to the application of platinum group metal or oxide coatings to the bipolar electrodes or monopolar electrodes, lead dioxide can be applied simply by an electroplating route as is known per se.

Platinum group metal coated $TiO_x$ and lead dioxide coated $TiO_x$ anodes are considered suitable for use in metal electrowinning of metals such as zinc, cobalt, copper, manganese, nickel or precious metals. Tests in simulated zinc winning electrolytes containing 165 g/l sulphuric acid with and without additions of chloride, fluoride and manganese have proved satisfactory.

As mentioned above, the experiments have taken place using coated $TiO_x$ as bipolar electrodes in the production of sodium chlorate. Samples have also been subjected to tests as bipolar electrodes in hypochlorite cells for the electrolysis of seawater (sometimes known as electrochlorinators). The test conditions were a 3% sodium chloride solution at 26° C. with both the anodes and cathodes having a current density of 1.5 kA/m$^2$. Both platinum and platinum-iridium coated samples are performing satisfactorily to date at low over-potentials.

In addition to the uses mentioned above, the anodes may be satisfactory for use in redox reactions such as the oxidation of manganese, cerium, chromium and for use as products in the oxidation of organic intermediates. The electrode materials may also be suitable for use in copper winning using the Duval process, involving the oxidation of ferric ions at the anode.

Because of the essentially brittle nature of bulk $TiO_x$ the main use in cathodic protection installations could be for use as a ground bed electrode such as are used in the protection of oil well structures. This is particularly the case where acidic conditions develop around the anodes. The anodes may be useful for several types of ground bed applications, such as coke filled, open hole etc. It may be possible to use stubby screw-on coated $TiO_x$ electrodes for the cathodic protection of oil platforms.

Metal finishing baths are usually hot and strongly acidic and existing coated titanium electrodes are susceptible to acid undermining. The resistance of $TiO_{1.75}$ suggests application of the material in the coated form for metal finishing electrodes, particularly for nickel, chromium and cobalt plating systems.

The material being inherently a ceramic-like material is generally resistant to abrasion and may be useful in those circumstances where abrasion is possible, such as in the cathodic protection of pumps and in electrochlorinators. The use of powdered $TiO_x$ may be considered advantageous, particularly for a conducting "back fill" for ground bed electrodes. Also coated powders may be used in fluidised bed type electrodes. The materials of the invention may also find application in batteries, effluent treatment and electroflotation, also as the basis for an electrode in a photo-electrolyser or fuel cell.

The material may be used as an earthing electrode in an electrolytic cell. An earthing electrode basically comprises an anode located in the pipework of the brine supply to an electrolytic cell to prevent stray currents passing through the pipework to earth. Effectively the material acts as an anode and would evolve chlorine or oxygen as appropriate.

Where used in the form of coated tubes it is necessary to make an electrical connection to the tube. This can be done by using a spring clip into which the tube is fitted—the spring clip being formed of, for example, titanium and joined onto an electrical conductor—or alternatively an internal connection to the tube may be provided, particularly if the tube is of a non-porous nature.

1. An electrochemical cell incorporating an electrode in which the electrode is formed from an electrode material of solid coherent bulk titanium oxide having the general formula $TiO_x$ where x is a number in the region 1.67 to 1.9.

2. A cell as in claim 1 furher characterized in that x is in a range selected from the groups 1.67 to 1.85 and 1.7 to 1.8.

3. A cell as in claim 2 in which the titanium oxide is selected from the group consisting of predominantly $Ti_4O_7$ and predominantly $Ti_5O_9$.

4. A cell as in claim 1 in which there is provided an electrocatalytically active surface on part at least of the surface of the electrode.

5. A cell as in claim 4 in which the electrocatalytically active surface includes a material selected from the group consisting of platinum group metals, platinum group metal alloys, platinum group metal oxides, lead and lead dioxide.

6. A cell as in claim 4 in which the cell is used for metal electrowinning and the anodes in the cell are formed of the electrode material.

7. A cell as in claim 6 in which the metal to be electrowon is selected from the group consisting of zinc, cobalt, manganese, copper, nickel, gold, platinum, silver, rhodium, ruthenium, palladium, osmium and iridium.

8. A cell as claimed in claim 4 in which the cell is a metal plating cell, the metal being plated being selected from the group consisting of nickel, chromium, cadmium and iron.

9. A cell as in claim 1 in which the electrode is formed of a range of titanium oxide compositions.

10. A cell as in claim 1 in which the cell comprises a cathodic protection system and the electrode comprises an anode.

11. A cell as in claim 10 in which the anode is a ground bed anode.

12. A cell as in claim 1 in which the cell is a bipolar cell and the bipolar electrode is formed of the titanium oxide material, preferably having a coating on one or both of its active faces.

13. A cell as in claim 12 in which the cell comprises a plurality of bipolar electrodes assembled in an array, the cell being a chlorate or hypochlorite cell having an aqueous sodium chloride feed and a chlorate or hypochlorite removal system.

14. A cell as in claim 12 in which the current passing through the cell is periodically reversed.

15. A cell as in claim 1 in which the current passing through the cell is periodically reversed in direction.

16. A cell as in claim 1 in which the electrode is formed of a series of tiles of the titanium oxide material, each tile being bonded to a substrate metal by an electrically conductive joint.

17. A cell as claimed in claim 1 in which the cell is used for the synthesis of organic compounds or inorganic compounds.

18. A cell as claimed in claim 1 in which the cell is an electrode boiler and alternating current is applied to the cell to boil liquids between the electrodes formed of the electrode material.

19. An electrode for use in an electrochemical cell, the electrode consisting essentially of a solid coherent bulk titanium oxide having the general formula $TiO_x$ where x is a number in the region 1.67 to 1.9 and an electrocatalytically active surface or part at least of the surface of the electrode.

20. An electrode as in claim 19 in which the electrode is in the form of a plate with electrocatalytically active material on one side only.

21. An electrode as in claim 20 in which the electrode material is manufactured by reducing titanium dioxide in a reducing atmosphere at a temperature in excess of 1000° C. for a time in excess of one hour.

22. An electrode as in claim 21 in which the reduction takes place in an atmosphere of hydrogen.

23. An electrode based on titanium in which all the titanium is present in the form of an oxide having the general formula $TiO_x$ where x is a number in the region 1.67 to 1.8, the electrode being a solid coherent bulk titanium oxide.

24. An electrode as in claim 23 in which the electrode material is manufactured by reducing titanium dioxide in a reducing atmosphere at a temperature in excess of 1000° C. for a time in excess of one hour.

25. An electrode having a substrate consisting only of a metal in oxide form, the metal being titanium and the oxide having a general formula of $TiO_x$ where x is in the region 1.67 to 1.8, the oxide being in solid coherent bulk form and having an electrolytically active surface on part at least of the surface of the electrode.

* * * * *